United States Patent [19]

Beyer

[11] Patent Number: 4,707,582

[45] Date of Patent: Nov. 17, 1987

[54] METHOD AND APPARATUS FOR OPERATING AN INDUSTRIAL ROBOT WITH SENSOR-CORRECTION

[76] Inventor: Hasso Beyer, Kreuzeckstr. 9, 8900 Augsburg, Fed. Rep. of Germany

[21] Appl. No.: 877,409

[22] Filed: Jun. 23, 1986

[30] Foreign Application Priority Data

Jun. 24, 1985 [DE] Fed. Rep. of Germany ....... 3522581

[51] Int. Cl.$^4$ ............................................ B23K 11/00
[52] U.S. Cl. ................................... 219/86.41; 901/42; 901/46
[58] Field of Search ............. 219/86.25, 86.41, 124.34; 901/10, 42, 46

[56] References Cited

U.S. PATENT DOCUMENTS

| | | | |
|---|---|---|---|
| 4,397,188 | 8/1983 | Bansevichus et al. | 901/46 |
| 4,447,697 | 5/1984 | Dunne et al. | 219/86.41 |
| 4,517,653 | 5/1985 | Tsuchihashi et al. | 901/42 |

FOREIGN PATENT DOCUMENTS

| | | |
|---|---|---|
| 2508968 | 1/1975 | Fed. Rep. of Germany . |
| 667362 | 6/1979 | U.S.S.R. ............................ 219/86.41 |

OTHER PUBLICATIONS

Stute et al, "Neue Entwicklungen in der Steuerungstechnik fur Handhabungssysteme", Seitschrift fur Industrielle Fertigung, 70 (1980), pp. 505-509.

Primary Examiner—Clifford C. Shaw
Attorney, Agent, or Firm—Hill, Van Santen, Steadman & Simpson

[57] ABSTRACT

The invention relates to a method and an apparatus for operating an industrial robot, for the accurate processing of workpieces, especially during spot-welding, wherein coordinates of processing points or lines are preselected according to a program and an actual position of a processing point is detected by a sensor carried by the robot hand, the difference between the actual position and a desired position being determined, and the correction of all coordinates of the operating points by the difference in position being carried out in accordance with this determination.

4 Claims, 6 Drawing Figures

METHOD AND APPARATUS FOR OPERATING AN INDUSTRIAL ROBOT WITH SENSOR-CORRECTION

BACKGROUND OF THE INVENTION

1. Field of the Invention

The invention relates to a method for operating an industrial robot, for the accurate processing of workpieces, especially during spot-welding, wherein coordinates of processing points or lines are preselected according to a program; the invention also relates to a processing device, especially welding tongs for an industrial robot, adapted to be mounted thereon for the accurate processing of workpieces.

2. Review of the Prior Art

In the processing of workpieces by means of a programmable industrial robot, the procedure is generally first of all to feed to the robot the predetermined processing points on a workpiece according to their coordinates ("teach-in"). To this end, the robot may be moved, manually for example, to each of the processing points. The coordinates of these processing points, which are detected by the robot's own path-measuring system, are then fed to the robot's operating memory. In addition to this manual data-input, manual programming and mechanical programming are possible, but this list is not conclusive.

All of these programming methods are based upon the fact that the workpieces to be processed have very accurately defined dimensions and are held for processing in a very accurately defined location. Otherwise it is impossible for the industrial robot to "find" exactly the preselected operating points on the workpiece. Positional inaccuracies, which may be due to dimensional inaccuracies in the workpiece, positioning inaccuracies of the workpiece, or also inaccuracies in the robot itself, lead to defective processing.

SUMMARY OF THE INVENTION

In view of the foregoing problems, it is first of all the purpose of the invention to provide a method for operating an industrial robot, for the accurate processing of workpieces, especially during spot-welding, which method can be relied upon to ensure accurate processing, even in the presence of positional or positioning inaccuracies.

This purpose may be accomplished by the following steps: namely detecting, by means of a sensor on the processing device, the actual position of a processing point or a starting position (in the event that the processing is carried out line-wise instead of spot-wise); determining the difference between the actual position and the preselected position; and correcting the coordinates of the processing point by the difference in position.

In the operation of the invention, therefore, the actual position of a point on a workpiece, or of a starting point, is accurately detected, and a correcting dimension is obtained by the resulting displacement from the preselected position previously fed to the robot according to the program. Correcting the remaining processing points, preselected according to the program, by the amount of the above correction, eliminates the need to determine accurate actual position for each processing point or line. Processing with the preselected processing point can thus be carried out, even in the presence of dimensional inaccuracies, at an acceptable cost and in an acceptable amount of time.

BRIEF DESCRIPTION OF THE DRAWINGS

The invention will now be described in connection with the accompanying drawing attached hereto illustrating one embodiment only, wherein.

DESCRIPTION OF THE PREFERRED EMBODIMENT

Figure 1:
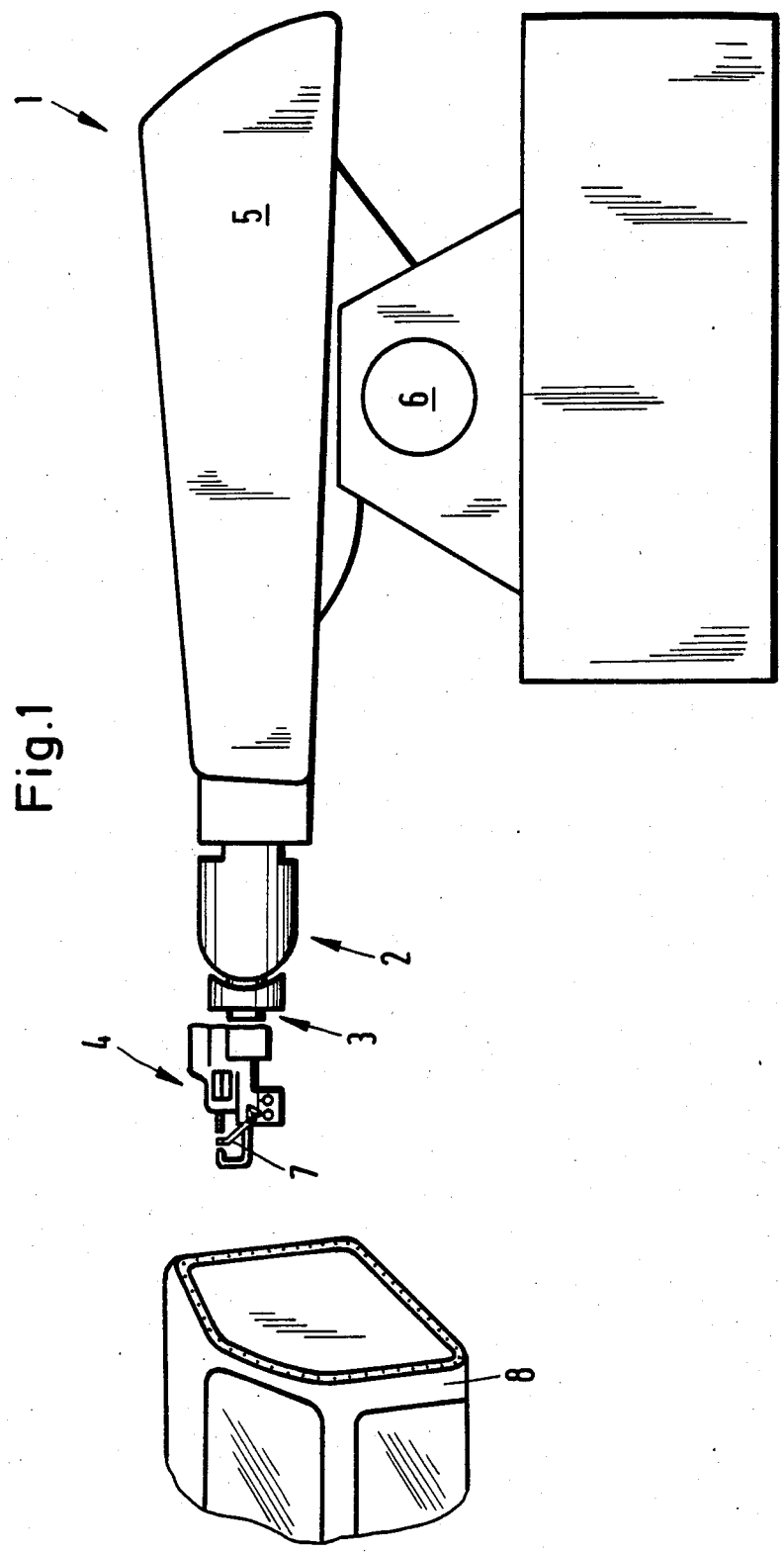
FIG. 1 is an overall view of an industrial robot according to the invention, with welding tongs according to the invention, together with a workpiece to be processed.

It is to be understood that the above-mentioned steps must be carried out before the start of each operating program. In the case of complex workpieces, it is desirable to break down the operating programs into a series of part-programs, each corresponding to a related processing line or to a related series of processing points. In this case, the method according to the invention is applied before each part-program is started.

In one example of the method according to the invention, a further actual position of another processing point is carried out with a sensor and the preselected processing curve, or line, upon which the processing points lie, is corrected in such a manner that it passes through the points detected by the sensor. This permits even better correction of the processing curve or line. Furthermore, various dimensional deviations can be reliably detected by the said processing curve or line, and may be compensated for accordingly.

It is highly desirable in this connection that the other processing point be spatially as far as possible from the first point, so that both the starting and finishing points are included. However, under certain circumstances it is possible for the geometry of the workpiece, in the vicinity of the starting and finishing points, to be such that, as a result of dimensional inaccuracies, there may be a danger of the processing apparatus striking possible projections on the workpiece during detection by the sensor. In this case, processing points for detection by the sensor should be selected at a distance from the start and finish of the processing curve or line.

According to another preferred example of the method, one edge of the workpiece is detected by the sensor, the actual position of the processing point being determined by the known distance between the said processing point and the edge of the workpiece. This has the additional advantage that detection with the sensor can be carried out relatively easily, since only the actual position of the edge of the workpiece need be detected. This is based upon the knowledge that, even if the workpiece contains considerable inaccuracies, inaccuracies between the edge of the workpiece and processing points carry almost no weight, especially if processing points in the vicinity of the edge of the workpiece are provided, as is frequently the case with spot-welding, for example. More particularly, this example of the method according to the invention has the advantage that different distances between the edge of a workpiece and processing points may be taken into account systematically. It must be understood, however, that this example of the method should not be applied if the processing points are very far from the edge of the workpiece, and considerable dimensional deviations are to be expected over this distance. In a case of this kind, howver, an edge, depression or the like in the workpiece, if present, i.e., any edge on the workpiece which is suitable for detection with a sensor, can be so detected. In the absence of such a feature, arrangement could be made for the provision thereof during production, to permit detection by the sensor.

Another example of the method according to the invention relates to the approach to the processing points, or to the edge of the workpiece during detection by the sensor. This appproach is preferably carried out with the industrial robot initially moving rapidly towards the workpiece and then, at a safe distance therefrom, changing over to a creeping movement. This safe distance is not a fixed value, but is preferably selected individually in respect of each series of workpieces to be processed. Obviously this safe distance is dependent upon the dimensional inaccuracies to be expected; on the one hand, a collision between the workpiece and the robot must be avoided; on the other hand, detection by the sensor should take as little time as possible.

It is also the purpose of the invention to provide a processing apparatus, adapted to be connected to an industrial robot, for the accurate processing of workpieces, the said apparatus making accurate processing reliably possible, even in the presence of positional or positioning inaccuracies.

According to the invention, this purpose is accomplished by the provision of a sensor, by means of which the position of the processing apparatus in relation to the workpiece can be detected accurately, at least in one dimension.

The teaching that the position of the processing apparatus in relation to the workpiece be accurately detectable at least, in one dimension, is based upon the knowledge that, in very many applications one-dimensional correction is quite sufficient. This applies in particular to processing apparatus such as welding tongs for example, in which the processing tools are adaptably mounted, for example, floatingly. It is therefore preferred to teach that the position of the processing apparatus in relation to the workpiece be accurately detected *only* in one dimension. Depending upon the characteristics of the workpiece and the processing apparatus, it can then be determined in which direction the position of the workpiece should be detected. One-dimensional detection can therefore ensure that a correction is carried out in the dimension in which the tool of the processing apparatus is not movable by reason of its mounting, so that further correction is unnecessary. This permits highly accurate processing, with a minimum of additional time for detection of the position of the apparatus by the sensor.

In one configuration of the apparatus according to the invention, the sensor is a contact-sensor. Thus what is reported, or detected by the sensor, is a contact with the workpiece. This is particularly advantageous when the processing apparatus is in the form of welding tongs. It is well know that, in the vicinity of welding tongs used for spot-welding, strong electrical fields obtain, which may sharply affect optical sensors or proximity-switches (i.e., electrical sensors containing electrical or electronic functioning parts.

In another configuration, the processing apparatus comprises a processing tool, while the sensor comprises a stop-element in the form of a stop-plate or the like. This sensor is arranged at a distance from, or at the side of, the processing tool. In order not to impede processing operations and, on the other hand, in order not to be affected or damaged by such operations, the sensor is adapted to be moved back from a contact-position to a retracted position.

It is possible to conceive of a whole series of processing apparatuses in which the arrangement described hereinbefore may be used, for example, a drilling machine, a milling machine, or a de-burring machine, or a gripping device, or a device of some other kind, as described in West German Patent Application P 35 11 905.5.

Very specially preferred, and highly advantageous, is the use of the processes and apparatus described hereinbefore, and the method characteristics, in the case of welding tongs, more particularly for spot-welding, adapted to be connected to an industrial robot. According to the teaching of the invention, these welding tongs comprise a sensor which may be designed according to one of the measures described hereinbefore in connection with a general processing device. Provision is made for the sensor to be located in a position of contact between two welding tong electrodes which are moved apart in their inoperative positions. Thus, welding tongs constitute a very advantageous location for the sensor. The separated electrodes provide sufficient room for the sensor to move towards the edge of the workpiece. However, as soon as the workpiece, or the edge thereof, is detected, the electrodes are already in the immediate vicinity of the processing points.

Furthermore, if the processing apparatus is a welding unit, it is desirable for the sensor to be adapted to be moved, rearwardly and upwardly, from the contact-position to a retracted position. During welding, especially spot-welding with suitable welding tongs, sparks and sputters are produced, and these move substantially tangentially to the electrodes. If the sensor is moved rearwardly and upwardly, it is out of the sputter-range. On the other hand, it can be very quickly returned to the contact-position.

A suitable arrangement for moving the sensor back from the contact-position to the retracted position, and for moving it forward from the retracted position to the contact position, is provided by a lever-mechanism. A simple mechanical linkage of this kind has many advantages in view of the previously mentioned strong electrical fields obtained around welding tongs.

According to another configuration, contact between the workpiece and the sensor is sensed by a limit switch arranged opposite the end with which the sensor touches the workpiece. At this end of the sensor, for example, the linkage representing the sensor may comprise an actuating cam which cooperates with the limit switch. Thus, when the actuating cam engages the limit switch, the latter shuts off any further forward movement of the industrial robot.

FIG. 1 is a general side elevation view of an industrial robot 1 provided with a robot hand 2, on the flange-element 3 of which are mounted welding tongs 4. The boom 5 of the robot is adapted to pivot in the plane if FIG. 1 about axis 6; in addition to this, the boom 5 is adapted to swivel horizontally from the position shown in FIG. 1. The robot hand is also mounted for pivoting and swivelling movement relative to the boom 5, and these movements allow the welding tongs to reach any desired position within reach of the hand.

As illustrated generally in FIG. 1, the welding tongs 4 are provided with a sensor 7 to be described in detail below. The figure also illustrates a workpiece 8 on which, in the example illustrated, spot-welding is to be undertaken.

Figure 2:
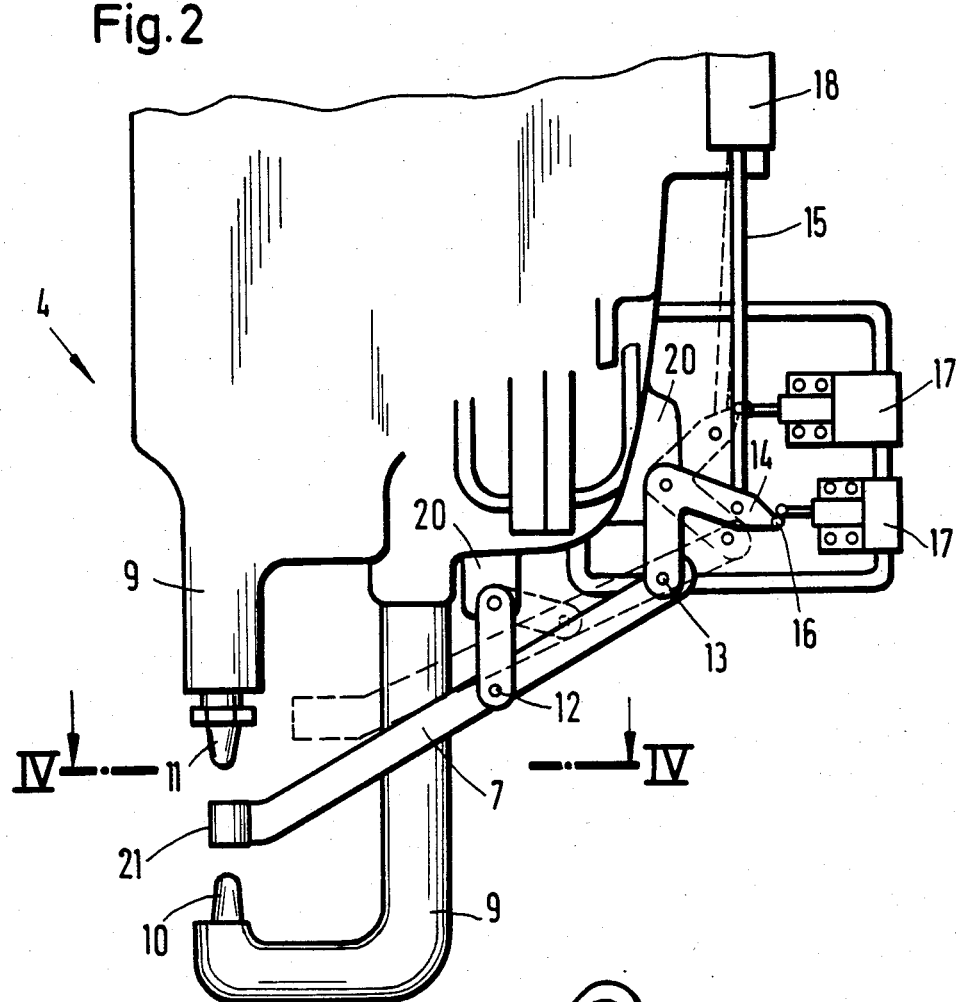
FIG. 2 is an enlarged view of the welding tongs of the industrial robot illustrated in FIG. 1.
Figure 3:
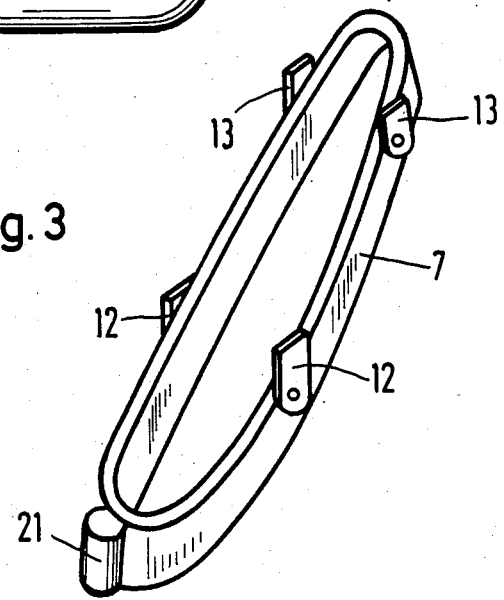
FIG. 3 is a perspective view of a sensor-linkage employed in the welding tongs of FIG. 2.

Referring now to FIG. 2, the welding tongs 4 are equipped with pole-arms 9 carrying respectively a lower electrode 10 and an upper electrode 11, between which are positioned a sensor 7 shown in its contact-position ready to contact the workpiece 8. The electrodes 10 and 11 are retracted away from one another, allowing the sensor to be moved between the said electrodes. The sensor, which is also shown alone and in perspective in FIG. 3 for greater clarity of illustration, is secured to the welding tongs 4 by means of spaced, pivoted guide bars 12 and 13. The guide bar 13 is in the form of a bell-crank, the free arm 14 thereof being hinged to an actuating rod 15 and also acting as a switch-cam 16 cooperating with limit switches 17a and 17b. The actuating rod 15 is connected to the piston of an air-cylinder 18 or the like, by which the sensor 7 can be moved from the contact position shown in solid lines in FIG. 2 to the alternative retracted position shown in broken lines therein.

Figure 4:
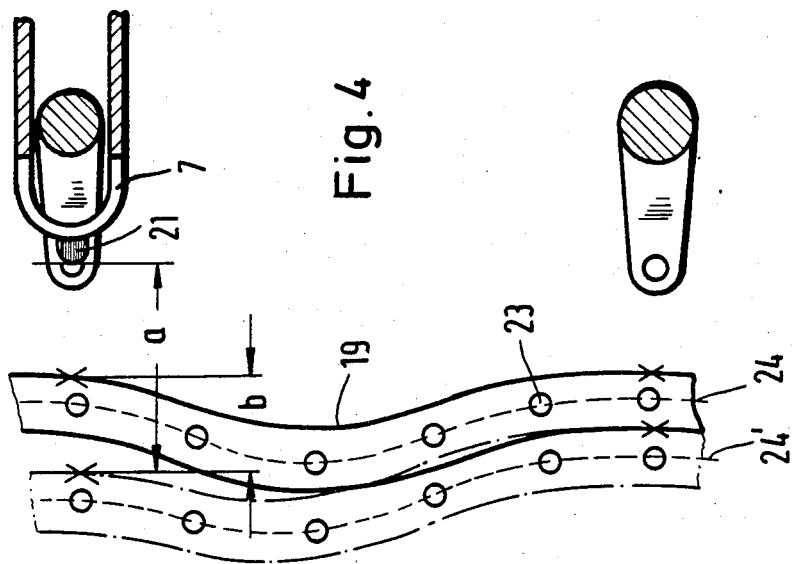
FIG. 4 is a cross-section, along the line IV—IV in FIG. 2, and also including a cross-section through a workpiece to be processed.

When welding tongs 4 approach a workpiece 8 with the sensor 7 located as shown in FIG. 2, a stop element 21 of the said sensor impinges upon one edge of the workpiece (see FIG. 4). This causes the sensor to move to the right and cam 16 to actuate first limit switch 17a, thus halting the forward movement of robot 1 and welding tongs 4. The sensor is then moved to its retracted position by the air-cylinder 18, the movement of actuating rod 15 being halted when the cam 16 actuates second limit switch 17b. Before a new (part-) work-program is initiated, the sensor 7 is moved, by air-cylinder 18 and actuating rod 15, out of the retracted position forwardly into the contact-position, this movement being halted when cam 16 again cooperates with first limit switch 17a.

The specific hinging and fitting of guide bars 12 and 13, and limit switches 17a and 17b, to welding tongs 4 is shown in FIG. 2 merely by way of example; it will be apparent to one skilled in the art that the mountings 20 to which the guide bars are connected may also be of another design.

The preferred method of operation of the apparatus according to the invention will now be explained in more detail in conjunction with FIGS. 4 and 5. Industrial robot 1 and welding tongs 4 thereof, of which only the lower pole-arm 9 is shown in FIG. 4, is first moved towards the workpiece at its fast speed. The nearest edge 19 of the said workpiece is indicated in FIG. 4 and at a safe distance a from an (assumed) position of edge 19, the rate of movement of welding tongs 4 is changed from fast speed to creep speed. As soon as the sensor, or stop-element 21 thereof, comes into contact with actual edge 19 of the workpiece, the cam 16 actuates limit switch 17a and this halts the creep speed movement of robot 1 and welding tongs 4. In the contact-position the stop-element of the sensor 7 is located at a short distance in front of center-line 22 of electrodes 10 and 11 (see the right-hand side of FIG. 5), and therefore the said sensor is set back slightly upon coming into contact with edge 19 of the workpiece until, due to the actuation of limit switch 17a, the movement of the robot is halted (see left-hand side of FIG. 5). This setback is determined by the configuration of cam 16 and of cooperating limit switch 17a and can therefore be set accurately.

In some embodiments the sensor 7 may be set back, in relation to center line 22, to an extent such that, when the robot is halted and the sensor is in the contact-position, the robot has already reached the operating point. However, this would mean that the contact-position of the sensor would have to be changed for each difference in the distance between edge 19 of the workpiece and a processing point 23 beyond the edge 19. In the preferred method of the invention, according to which the edge of the workpiece is detected by the sensor and the actual position of processing point 23 is determined from a known distance c between processing point 23 and the forward edge 19 of the workpiece, the significant advantage is obtained that, according to the system, different distances c can be taken into account, in that different distances c can be preselected, for example, in different part-work-programs.

Figure 5:
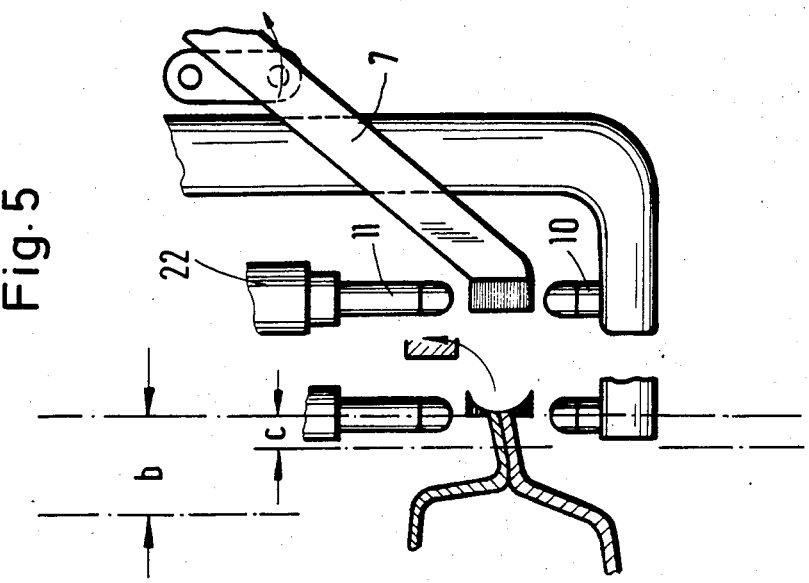
FIG. 5 is a side elevation corresponding to FIG. 4 clarifying the manner of approach of the welding tongs to a workpiece and the detection of the workpiece by the sensor thereof.

At the end of the movement of the industrial robot, the center line 22 of electrodes 10 and 11 is located accurately at edge 19 of the workpiece (see left-hand side of FIG. 5). The difference b between the predicted position of edge 19 of the workpiece (the desired position), preselected according to the program, and the actual position of said edge 19, is thus detected by means of the robot's own path-measuring system. Distance c between the edge of the workpiece and a processing point 23 is also known. Thus the program previously fed to the robot can be corrected by positional difference b.

As illustrated in FIG. 4, a further processing point 23 and a further point on edge 19 of the workpiece may also be detected by the sensor, as indicated by the second lower pole-arm 9, by means of two such points, which are spatially as far apart as possible, it is also possible to detect with accurate dimensions the displacement of an actual processing curve 24, and the actual operating curve 24, upon which actual processing points 23 are located, may be recalculted.

Figure 6:
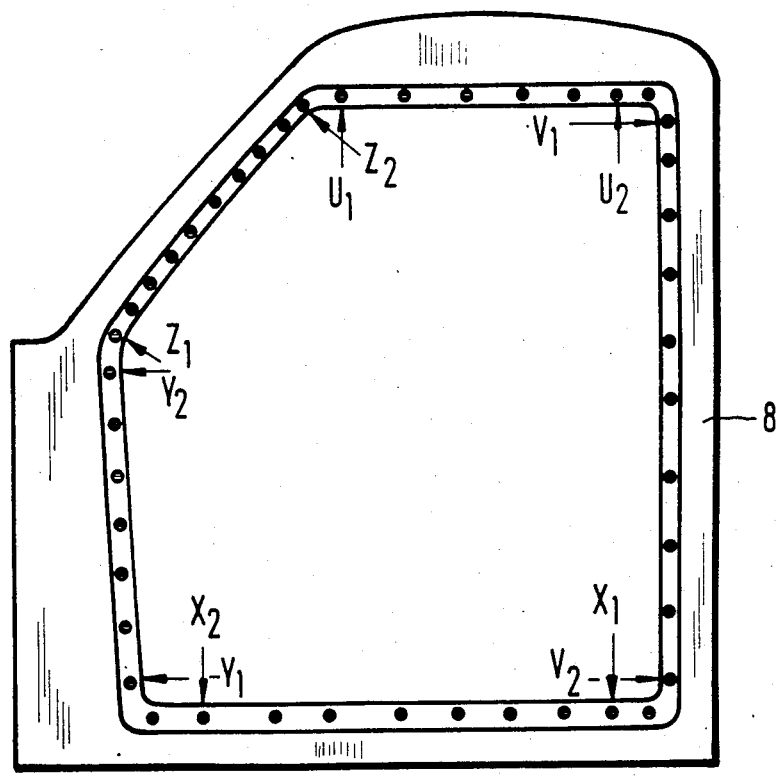
FIG. 6 shows an example of a workpiece to be processeed divided into various part-areas.

Finally, in the case of workpiece 8, shown by way of example in FIG. 6, it is illustrated that spot-welds to be carried out on this workpiece may be divided into separate linear sections between processing points X1 and X2, Y1 and Y2, Z1 and Z2, U1 and U2 and V1 and V2, with appropriate changes of direction between these linear sections.

The following further illustrates the manner in which corrections are made for differences in the position of the workpiece.

Correction using one point is illustrated with the following diagram and algorithm:

$$X_A \quad X_1 \quad X_2 \quad X_i$$
$$* \text{---} \cdot \text{---} \cdot \text{---} \cdot \text{---} \cdot$$

$$X \text{ ref } A$$

where $XZ_A \ldots X_i$ represent predetermined point locations. X ref. A represents an actual point location.

$$\overrightarrow{\text{Correction}} = \overrightarrow{(X \text{ ref. } A - X_A)}$$

$$\Longrightarrow X_{inew} = X_i + \text{correction}$$

Correction using two reference points is illustrated using the following diagram and algorithm:

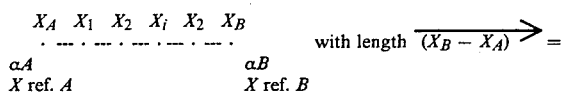

$$\text{length } \overrightarrow{(X \text{ ref. } B - X \text{ ref. } A)} \text{ correction } X_i =$$

$$\alpha_A + \frac{\left|\overrightarrow{(X_i - X_A)}\right|}{\left|\overrightarrow{(X_B - X_A)}\right|} \cdot (\overrightarrow{\alpha B} - \overrightarrow{\alpha A}) \Longrightarrow X_{inew} =$$

$$X_i + \alpha_A + \frac{\left|\overrightarrow{(X_i - X_A)}\right|}{\left|\overrightarrow{(X_B - X_A)}\right|} \cdot (\overrightarrow{\alpha B} - \overrightarrow{\alpha A}) \text{ or}$$

$$X_{inew} = X_i + \text{corrextion } X_i$$

It will be appreciated that changes and modifications can be made to the embodiments disclosed herein without departing from the spirit and scope of this invention.

I claim as my invention:

1. A processing device for an industrial robot, adapted to be connected thereto for the accurate processing of workpieces, and including in combination: sensor means by which the position of the processing device, in relation to a workpiece, may be accurately detected in at least one dimension, welding tongs having two electrodes for spot welding, said welding tongs being separated in their inoperative position, and means for mounting said sensor between the two electrodes of the welding tongs when said welding tongs are separated and out of contact with said workpiece.

2. A processing device according to claim 1, characterized in that the sensor is adapted to be moved rearwardly and upwardly from the contact-position to the retracted position.

3. A processing device according to claim 2, characterized in that the sensor is adapted to be retracted by means of a lever-mechanism.

4. A processing device according to claim 1 characterized in that contact with a workpiece is detected by the sensor which causes operation of a limit switch at the end of said sensor remote from the contact end of the sensor.

* * * * *